UNITED STATES PATENT OFFICE 2,100,437

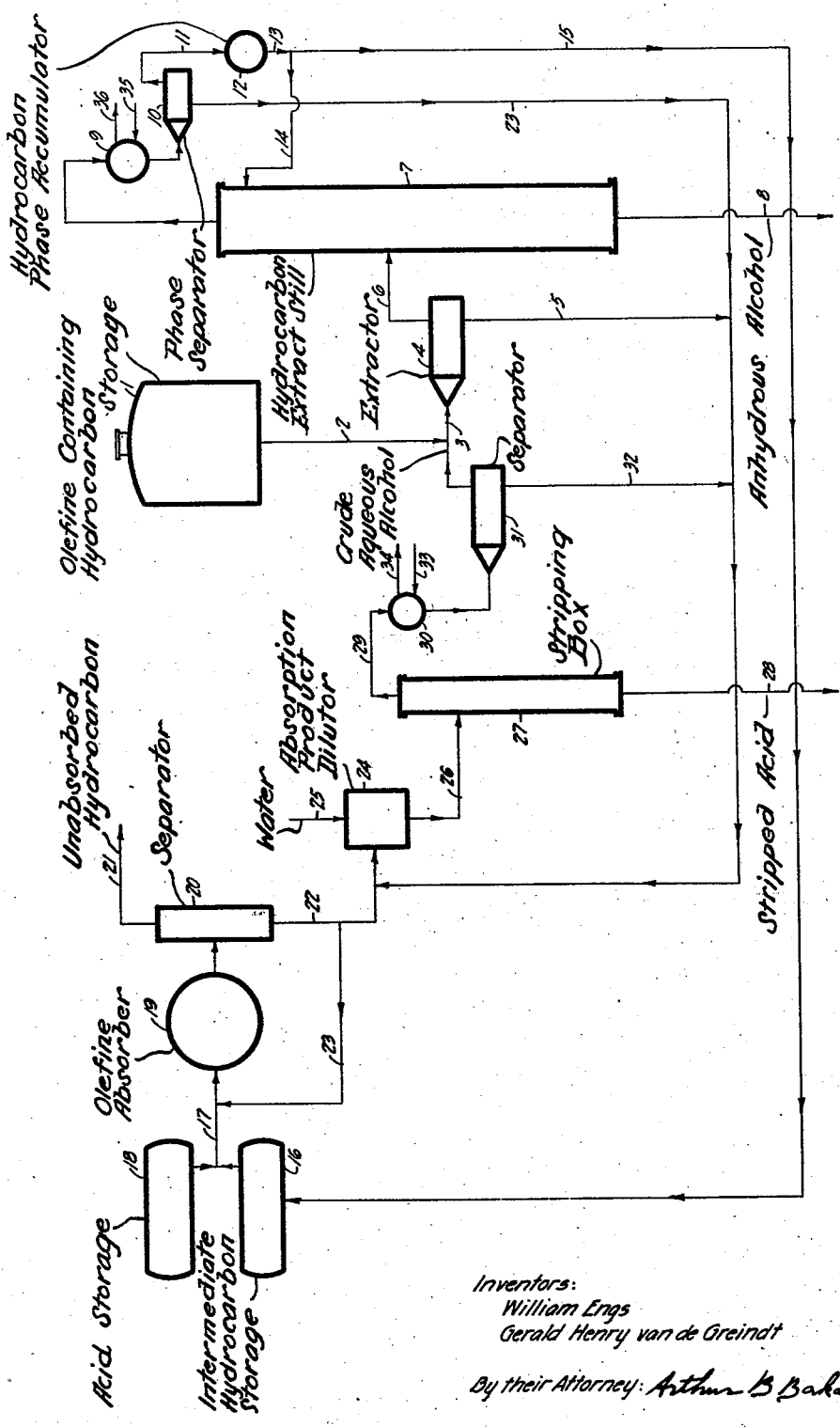

PROCESS FOR THE PRODUCTION OF ANHYDROUS HYDROCARBON DERIVATIVES

William Engs, Oakland, and Gerald Henry van de Griendt, Berkeley, Calif., assignors to Shell Development Company, San Francisco, Calif., a corporation of Delaware Application October 13, 1936, Serial No. 105,394

11 Claims. (Cl. 260—156)

This invention relates to the manufacture of oxygen containing organic compounds such as alcohols, ethers, acids and esters from hydrocarbons. The process is particularly adapted for the production of secondary and/or tertiary alcohols, or other derivatives from olefines having four or more carbon atoms per molecule.

The primary object of the present invention is to efficiently and economically produce such compounds in an anhydrous form. In accordance with this object, water is separated from the alcohols or other derivatives, produced without the addition of any extraneous agents to the system as these require a separate purification step for their removal from the normal distillation products.

A further object of the invention is the provision of a process of dehydrating oxygen containing olefine derivatives by distillation, or extraction and distillation, with the hydrocarbon used in their manufacture.

Still another object of the invention is the production of derivatives of olefines of four or more carbon atoms by a method which permits recovery of regenerated and/or unreacted olefine and its return to the reaction system in a simple, uniform manner so that constant composition of feed may be maintained without recourse to elaborate proportioning devices or other expensive procedures.

Various methods for dehydrating alcohols and related olefine derivatives, many of which form constant boiling mixtures with water or for other reasons are difficult to obtain in a pure anhydrous condition, have been proposed in which a "third agent", such, for example, as benzol, is used to assist in the removal of water by azeotropic distillation. All prior alcohol dehydration methods have the drawback, however, that they require a separate distillation step to prevent contamination of the olefine regenerated in the recovery process by the added "third agent".

We have found that not only may this extra distillation be avoided but also the olefine reaction itself may be improved by using a procedure in which dehydration is effected by means of the same olefine containing hydrocarbon as is used for the production of the olefine derivative or derivatives being treated.

In order that our invention may be clearly understood it will be more fully described with reference to the accompanying drawing which is a diagrammatic representation of the steps of our process in one of its modifications applied to the manufacture of tertiary amyl alcohol by absorption of tertiary amylenes in aqueous sulfuric acid. It will be understood that other olefines having four or more carbon atoms per molecule, such for example, as isobutylene and/or butene-1 and butene-2 or pentene-1 and pentene-2 and higher homologues may also be used provided suitable adjustment of operating conditions in accordance with the known differences in character of these olefines are made. Any such olefines may be used either in a pure state as the chemical individuals or as pure olefinic mixtures or as an olefine or olefines admixed with one or more paraffinic hydrocarbons or other compounds which may be considered as inert in the alcohol manufacturing process. Olefines comprising hydrocarbon fractions consisting of, or predominating in, hydrocarbons containing the same number of carbons atoms to the molecule are a particularly advantageous starting material for the process of our invention.

In the drawing, 1 represents a source of a pentane-amylene fraction which may, for example, have the following approximate composition: pentanes 41%, secondary amylenes 37% and tertiary amylenes 22%. This hydrocarbon mixture is withdrawn thru pipe line 2 and admixed in pipe 3 with the crude, wet tertiary amyl alcohol being produced. The mixing may be facilitated by feeding the two materials thru a centrifugal pump or by other suitable means not shown. After mixing the materials are conducted to a separator such as 4 where two layers are formed, an aqueous layer containing in this case about 80% of the total water in the wet tertiary amyl alcohol which is removed thru line 5 and returned to the process as will be explained later, and a hydrocarbon layer containing the bulk of the tertiary amyl alcohol and the remaining water, which is fed by line 6 to a fractionating column 7. From this column a completely dehydrated bottom product of tertiary amyl alcohol may be withdrawn thru line 8 and redistilled in any suitable manner, not shown, to remove any remaining impurities such, for example, as small amounts of polymer. This dehydration is effected by distilling overhead the pentane-amylene as there is more than enough hydrocarbon present to remove the water remaining after extraction as the binary azeotropes of amylene and pentane with water.

The overhead product is condensed in condenser 9, cooled by a suitable refrigerant circulated therethrough by means of inlet and outlet lines 35 and 36, and stratified in separator 10. The aqueous layer is removed via line 23 and combined with the previously mentioned aqueous layer from separator 4. The hydrocarbon layer is removed by line 11 to reflux accumulator 12 from which a part is returned to the column by lines 13 and 14 while the remainder, representing the feed of pentane-amylene to the reaction system is taken by line 15 to an intermediate storage tank such as 16.

The pentane-amylene feed from tank 16 is admixed with 65% H$_2$SO$_4$ from tank 18. Other suitable mineral acid acting acid such as, for example, phosphoric, benzene sulfonic acid, or the like, of a concentration adapted in the known manner to the nature and concentration of the olefine or olefines being treated, may be substituted for sulfuric acid. The acid-hydrocarbon mixture is fed to a reactor 19, preferably provided with temperature controlling means whereby the temperature may be maintained within the range known to be suitable for the particular olefines and acid involved. A temperature of from 0° to about 30° C. is suitable for the selective absorption of tertiary amylenes under the conditions here described, for example. The reactants are withdrawn from the reactor to a separator 20 at a rate which permits sufficient time of contact for the desired reaction, 10 to 20 minutes contact, for example, is sufficient in the present case. Unreacted hydrocarbon comprising principally pentanes and secondary amylenes is taken off as upper layer thru line 21 and acid layer is withdrawn thru line 22. A part of the withdrawn acid layer may advantageously be returned to the reactor via line 23, if desired. The remaining withdrawn acid layer is fed to a dilution tank 24 where it is mixed with the water recovered from separators 4, 10 and 31. Additional water such as may be necessary to replace losses and bring the mixture to the desired acid concentration for distillation, a sulfuric acid concentration of about 20% to 30% on a hydrocarbon free basis being suitable, may be added thru line 25 after which the diluted mixture may be conducted to a stripping column 27. Where secondary alcohols are being manufactured it is advantageous to provide for suitable hydrolysis of the alkyl esters as described, for example, in United States Patent 1,912,695, before distillation. In any case the acid may be removed from the alcohol or alcohols present, as bottoms 28 from the stripping column while alcohol, water and any olefine regenerated in distillation are removed thru line 29 and condensed in condenser 30 which is suitably cooled by a refrigerant circulated therethru by means of inlet and outlet lines 33 and 34. Where amyl or higher alcohols are being produced the process of United States Patent 1,955,416 may be availed of as an alternative for the stripping procedure here described. In either case crude tertiary amyl alcohol containing water may be recovered as an upper layer withdrawn thru line 3, from a separator such as 31, while an aqueous layer is taken off thru line 32 and added to the other dilution water going to tank 24. The crude tertiary amyl alcohol thus withdrawn is that admixed with the feed from line 2 as before described.

It is thus clear that our process offers many advantages. The amylenes formed in the stripping column 27 by decomposition of alcohol may in some cases, amount to about 15% by volume of the total crude alcohol. Consequently their return to the reaction system is very important. Since they are concentrated they must be blended with the feed in order to avoid the introduction of variable factors which make continuous operation extremely difficult. Mixing the crude amylene-pentane with the crude alcohols permits continuous blending of the hydrocarbons without resorting to elaborate proportioning devices which would otherwise be necessary. Furthermore if a dissimilar dehydrating agent such as hexane, benzene, or the like such as has heretofore been employed, is used, the amylene must be distilled from the crude alcohol before dehydration, or the dehydrating agent must be separately distilled to remove amylene therefrom, to avoid contamination of the amylene returned to the reactor. In either case, an extra distillation, which is rendered unnecessary by the process of our invention, is required.

While our process has been described in connection with alcohols, particularly with the manufacture of one individual alcohol, tertiary amyl alcohol, it will be apparent that the process is not limited to such applications, since not only may it be applied to other individual alcohols of four or more carbon atoms, as has already been pointed out, but also it may be used for the production of mixtures of such alcohols, such, for example, as may be obtained, by absorbing a tertiary olefine in an acid liquor produced by absorption of the corresponding secondary olefine in an aqueous mineral acid acting acid and dilution of the resulting solution as described and claimed in our copending application Serial No. 734,118, filed July 7, 1934. Furthermore, other methods for converting olefines to the corresponding alcohols, such, for example, as direct hydration procedures, etc., may be used. Not only may other olefine derivatives such as esters, ethers, halohydrins, and the like, but also similar or other derivatives of paraffins and cyclic hydrocarbons such, for example, as the acids, aldehydes, etc., obtainable by partial oxidation of such hydrocarbons, be similarly treated. In fact, the process of our invention may be applied to the production of any oxygen containing derivative of hydrocarbons in which an aqueous intermediate product which it is desirable to dehydrate is formed, irrespective of the source of the hydrocarbon used as starting material or the nature of the reaction employed. While our process may be used in the production of derivatives of the lower hydrocarbons, we find as a practical matter that the pressures involved when using ethylene and/or propylene fractions, for example, necessitate the use of such expensive distillation apparatus that we prefer to limit our process to the treatment of derivatives prepared from hydrocarbons containing substantial amounts of compounds of at least four carbon atoms per molecule. In its application to the production of secondary and/or tertiary alcohols having four or more carbon atoms per molecule by absorption of the corresponding olefines in a mineral acid acting medium, our invention has particular advantage however, because this reaction is an especially sensitive one in which careful control of the olefine : acid ratio must be maintained at all times in order to prevent olefine regeneration. The ease of blending of such regenerated olefine with the feed which our process provides makes all steps in the process smoother, particularly under conditions of continuous operation with olefine-paraffin mixtures.

Our process is not only capable of many varied applications but also of many modifications. It may be used in either continuous, intermittent or batch operations. In some cases it may be advantageous to use only a part of the hydrocarbon feed for dehydration instead of the total feed as described in the foregoing example. Instead of the hydrocarbon itself a suitable substitution product thereof which is formed as an intermediate or by-product in the operations involved may be used as the dehydration agent. Still other changes such as will be apparent to those skilled in the art may be made without departing from the spirit of our invention which is to be regarded as limited only by the terms of the accompanying claims, in which it is our intention to claim all novelty inherent therein as broadly as possible in view of the prior art.

We claim as our invention:

1. In a process of producing a substantially anhydrous oxygen containing derivative of an olefine having at least four carbon atoms per molecule, the steps of removing water from the aqueous derivative by mixing therewith hydrocarbon in the liquid state containing said olefine, subsequently distilling a mixture of said derivative and said hydrocarbon to drive over water and said hydrocarbon, recovering the substantially dry olefine derivative as bottom product and using the olefine containing hydrocarbon distilled off as a source of further olefine derivative.

2. In a process of dehydrating an aqueous oxygen containing derivative of an olefine having at least four carbon atoms per molecule in which a third liquid miscible with the derivative but substantially immiscible with water is added to the aqueous derivative to be dehydrated and the mixture subjected to distillation to separate the third liquid and water from the derivative, the improvement which comprises supplying for said third liquid, the olefine containing hydrocarbon to be subsequently used as the source of said derivative.

3. The process of producing dry alcohols having at least four carbon atoms per molecule from the corresponding olefines which comprises hydrating an olefine having at least four carbon atoms per molecule, extracting the resulting aqueous alcohol with a hydrocarbon mixture in the liquid state comprising said olefine, distilling the extract phase to remove therefrom water and said hydrocarbon mixture, and hydrating at least a substantial part of the olefine content of said hydrocarbon mixture.

4. In a continuous process of producing a substantially dry alcohol of at least four carbon atoms per molecule by absorption of the corresponding olefine in a strong mineral acid solution the step of dehydrating the resulting aqueous alcohol solution by distilling off water therefrom with the olefine containing hydrocarbon of at least four carbon atoms per molecule subsequently used in said absorption so as to obtain a concentrated alcohol residue.

5. In a process of producing a secondary alcohol of at least four carbon atoms per molecule by absorption of the corresponding olefine in aqueous sulfuric acid and hydrolysis of the resulting alkyl sulfate solution the steps of dehydrating the substantially free-acid free aqueous alcohol, subsequently obtained by distillation with secondary olefine containing hydrocarbon of at least four carbon atoms per molecule without substantially distilling off the alcohol content and then using said hydrocarbon for said absorption.

6. In a process of producing a tertiary alcohol of at least four carbon atoms per molecule by absorption of the corresponding olefine in an aqueous mineral acid the steps of separating free acid from the absorption product and dehydrating the resulting aqueous tertiary alcohol solution by distilling off water therefrom with hydrocarbon of at least four carbon atoms per molecule containing said tertiary olefine so as to obtain a concentrated alcohol residue.

7. In a process of producing a mixture of secondary and tertiary alcohols by absorption of the tertiary olefine content of a hydrocarbon mixture having the same number of carbon atoms per molecule and containing tertiary and secondary olefines in an acid liquor produced by absorption of said secondary olefine in a mineral acid and dilution of the resulting absorption product, the step of dehydrating the aqueous alcohol mixture obtained as an intermediate product by distilling off water therefrom with said hydrocarbon mixture without substantially distilling off the alcohol content.

8. In a process of producing tertiary and secondary amyl alcohols by absorbing at least a part of the tertiary and secondary amylene content of a pentane-amylene fraction in aqueous sulfuric acid and subsequently separating a mixture of aqueous amyl alcohols from said acid, the steps of extracting said aqueous alcohol mixture with a pentane-amylene fraction containing a substantial amount of secondary and tertiary amylenes and distilling the resulting extract to remove therefrom pentane-amylene mixture and water and leave as bottom product substantially dry tertiary and secondary amyl alcohols.

9. In a process of producing secondary amyl alcohol by absorption of secondary amylenes from a pentane-amylene mixture substantially free of tertiary amylenes in aqueous sulfuric acid, hydrolysis of the resulting amyl sulfates, and removal of free sulfuric acid, the steps of extracting the aqueous secondary amyl alcohol obtained with a pentane-amylene mixture and distilling the resulting extract to remove therefrom pentane-amylene mixture and water and recovering substantially dry secondary amyl alcohol.

10. In a process of producing tertiary butyl alcohol by reaction of isobutylene containing hydrocarbon of at least four carbon atoms per molecule with aqueous sulfuric acid, the steps of distilling the aqueous tertiary butyl alcohol obtained with said hydrocarbon to remove water therefrom and subsequently reacting the hydrocarbon used in said distillation to produce a further amount of tertiary butyl alcohol.

11. In a process of producing an alcohol having at least four carbon atoms per molecule by absorption of the corresponding olefine in a mineral acid in which the absorption product is distilled to separate free acid from said alcohol the steps of condensing together olefine regenerated and alcohol vaporized in said distillation and blending the mixture with the hydrocarbon feed to the system.

WILLIAM ENGS.
GERALD HENRY VAN DE GRIENDT.